United States Patent [19]

Dahmen

[11] 3,990,854

[45] Nov. 9, 1976

[54] APPARATUS FOR THE MANUFACTURE OF CARBON BLACK

[75] Inventor: Karel R. Dahmen, Houston, Tex.

[73] Assignee: Continental Carbon Company, Houston, Tex.

[22] Filed: Oct. 14, 1975

[21] Appl. No.: 621,934

Related U.S. Application Data

[63] Continuation-in-part of Ser. No. 419,782, Nov. 28, 1973, abandoned, which is a continuation-in-part of Ser. No. 396,379, Sept. 12, 1973, abandoned, which is a continuation-in-part of Ser. No. 351,311, April 16, 1973, abandoned.

[52] U.S. Cl. .......................... 23/259.5; 239/132.3; 239/406; 239/433; 423/450; 431/158
[51] Int. Cl.² .......................................... C09C 1/48
[58] Field of Search ............... 23/259.5, 259.9, 278, 23/279; 423/450, 455–458; 431/284; 239/403, 405, 406, 418, 448, 400, 132.3, 433

[56] References Cited

UNITED STATES PATENTS

| 3,211,532 | 10/1965 | Henderson .......................... 23/259.5 |
| 3,254,846 | 6/1966 | Schreter et al. ................ 239/406 X |
| 3,353,915 | 11/1967 | Latham, Jr. et al. .......... 23/259.5 X |
| 3,501,274 | 3/1970 | Whittle et al. ..................... 23/259.5 |
| 3,669,628 | 6/1972 | Latham, Jr. et al. ............. 23/259.5 |
| 3,741,165 | 6/1973 | Matthews et al. ................... 122/6.5 |
| 3,755,543 | 8/1973 | Latham, Jr. ........................ 23/259.5 |

*Primary Examiner*—Morris O. Wolk
*Assistant Examiner*—Roger F. Phillips
*Attorney, Agent, or Firm*—Jerry B. Peterson

[57] ABSTRACT

A concentric burner and feedstock injection assembly, for a carbon black reactor, designed for the atomizing and burning of liquid fuels to provide the heat required for the reaction. The atomizing tip consists of two annular rings machined to form a throat having a generally converging annulus through which part of the combustion air, brought first into strong swirling motion, is accelerated and passes as an air stream having a hollow, frusto-conical, divergent pattern. Fuel oil is injected, through a plurality of holes drilled through the inner annular ring, into said air stream and is atomized by said stream. The balance of the combustion air is supplied to the combustion chamber which surrounds the burner and is in communication with the reaction zone of the reactor. Feedstock oil is injected into the reaction chamber through a tubular subassembly inserted through a central opening in the assembly.

19 Claims, 3 Drawing Figures

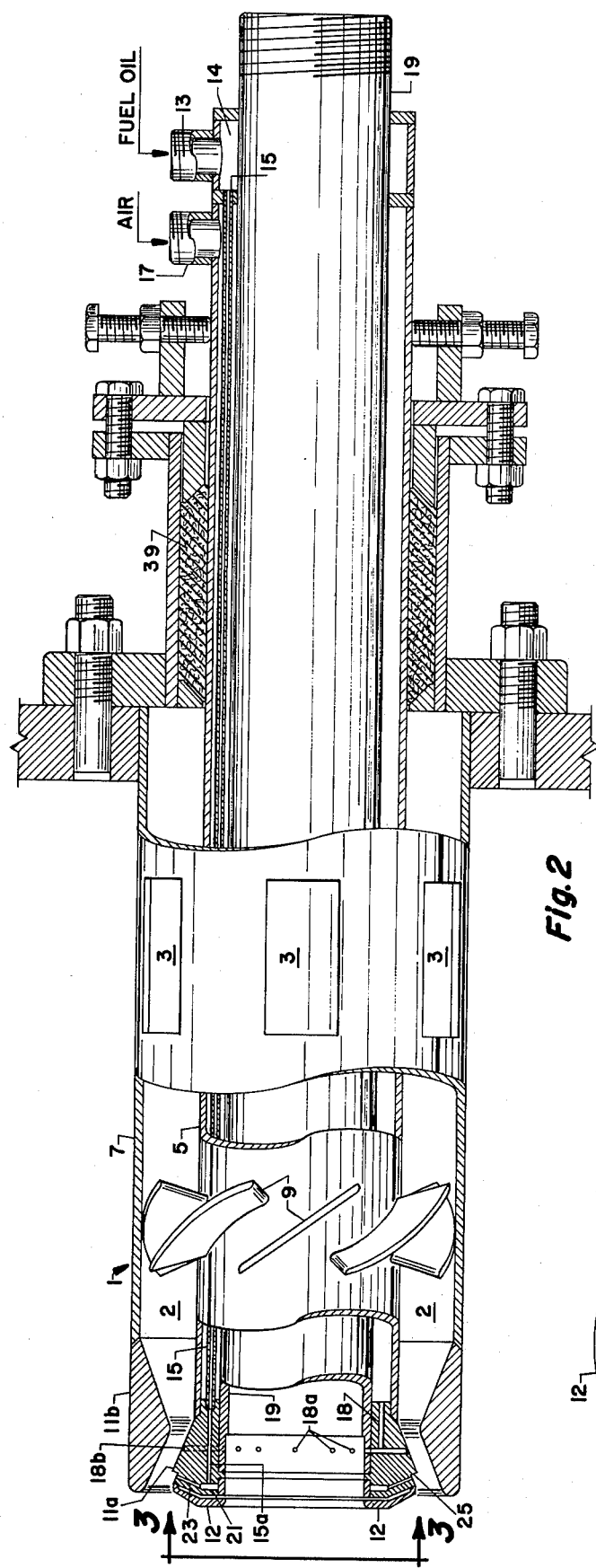
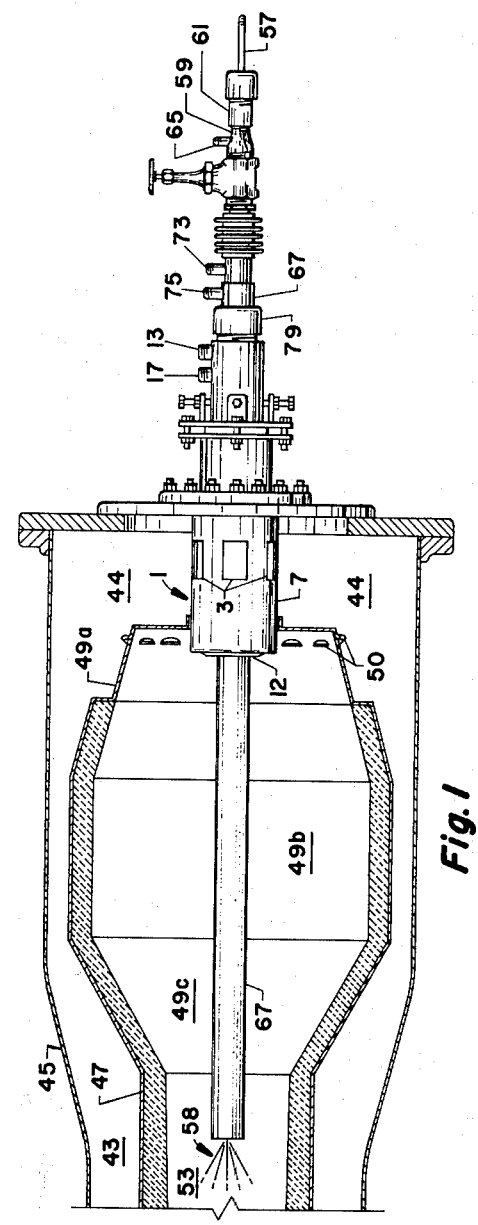
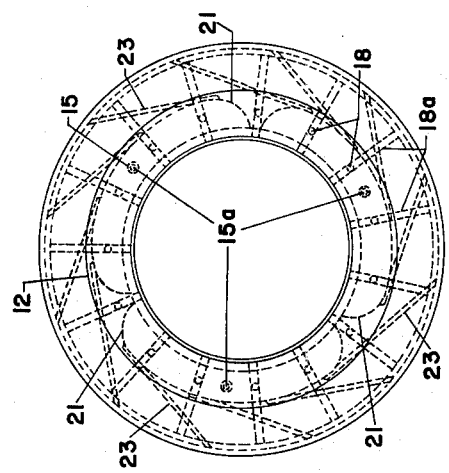

APPARATUS FOR THE MANUFACTURE OF CARBON BLACK

CROSS-REFERENCE TO RELATED APPLICATIONS

This is a continuation-in-part of Ser. No. 419,782 filed Nov. 28, 1973, now abandoned, which in turn is a continuation-in-part of Ser. No. 396,379, filed Sept. 12, 1973, now abandoned, which in turn is a continuation-in-part of Ser. No. 351,311, filed Apr. 16, 1973, now abandoned.

BACKGROUND OF THE INVENTION

This invention relates to the production of carbon black and more particularly to a burner and feedstock injection assembly for a carbon black reactor. The burner is designed for the atomizing and burning of liquid fuels to provide the heat required for the reaction.

Applicant does not claim that the use of liquid fuels in carbon black reactors is necessarily novel per se. For example, the following U.S. patents disclose specific fuel-oil burner injection systems designed for carbon black reactors: U.S. Pat. Nos. Re. 22,886; 2,420,999; 2,641,534; 2,961,300; 3,003,854; 3,060,003; 3,211,532; 3,290,120; 3,501,274; and 3,669,628.

The closest prior art known to the applicant which relates to his burner per se is U.S. Pat. No. 3,254,846 which embodies some of the same principles and configurations at the tip of the burner where the atomization of the fuel oil takes place. It will be noted, however, that said patent does not disclose the improvement of combustion by the use of high swirl numbers characterized by flow reversal zones and backmixing within the flame zone, nor does it disclose the possibility of carbon black manufacturing requiring a flame pattern that allows insertion of a central tube through the heart of the flame for injection of carbon black feedstock. Furthermore, applicant's burner design itself embodies other significant design features which are believed to be patentably different from the burner of said patent.

The principles of applying intensive swirl in burner design are described in the book *Combustion Aerodynamics* by Beer and Chigier, published (1972) by Halsted Press Division, John Wiley & Sons, Inc., New York, and in reports from the International Flame Research Institute of Ijmuiden.

In many instances natural gas is used as a fuel in carbon black reactors; however, in situations where gas is not available, or is not available at an economic price, it is desirable to have a burner which is designed for the use of liquid fuels, including heavy liquid fuels. The main problem in designing such a burner is that the high velocities required, particularly in carbon black reactors, do not provide enough residence time to provide for complete combustion of the fuel within the time allowed unless the atomization of the fuel is extremely efficient and extremely high rates of combustion are realized.

Conventional methods of high-pressure atomization result in high discharge velocities. The fabrication of the fuel discharge nozzle will determine to what extent the discharge pattern—and therefore the discharge velocity—will be radial or axial. A high axial velocity has the disadvantage of a long, drawnout flame undesirable in carbon black production in which the high velocities of reactants require rapid combustion and a short flame. A high radial velocity causes impingement of droplets on the inside surface of the rather small-diameter combustion chamber, resulting in undesirable coke formation.

For the carbon black process, in accordance with the technology used by the inventor, it is highly advantageous to have a flame of burning fuel enveloping the feedstock injection spray in a zone of high axial velocity, the base of the said flame being upstream of the feedstock injection point. It is also essential that the position of the feedstock oil spray can be moved along the centerline by extending or retracting the tubular feedstock injection subassembly through the burner and through the heart of the flame. This feedstock injection subassembly must be protected against the heat of the flame by internal liquid cooling or by an internal flow of cooling gas.

Broadly speaking, the object of this invention is to provide a burner, for a carbon black reactor, which will provide a high rate of combustion and a satisfactory flame pattern, even when operating with the use of heavy liquid fuel oils. More specifically, the object of the invention is to provide a burner with sufficient flame stability in a zone of high axial flow velocities and a combustion rate so high as to obtain essentially complete combustion a short distance from the burner head using liquid hydrocarbons with high carbon-hydrogen ratios, and using atomizing means that provide extremely fine atomizing while at the same time preventing liquid droplets impinging on the walls of the combustion chamber and causing coke formation such as usually occurs when the atomizing function relies on forcing liquid, air-liquid, or steam-liquid mixtures through small orifices under high discharge pressures. The pattern of discharge should be hollow and, in particular, it should prevent oil still in the liquid phase from coming in contact with the cool pipe of the feedstock injection subassembly.

It is another object of the invention to provide a fuel combustion system for a carbon black reactor that inhibits the formation of air polluting nitrogen oxides. Other objects will be apparent from the description which follows.

SUMMARY OF THE INVENTION

This invention comprises a concentric burner and feedstock injection assembly, for a carbon black reactor, designed for the atomizing and burning of liquid fuels (including heavy liquid fuels) to provide the heat required for the conversion of the feedstock into carbon black. The atomizing tip consists of two annular rings machined to form a throat having a generally converging annulus through which part of the combustion air, brought first into strong swirling motion, is accelerated and passes as an air stream having a hollow, frusto-conical, divergent pattern. Fuel oil is injected, through a plurality of holes disposed throughout the cross section of the inner annular ring, into said air stream and is atomized thereby. When the burner is installed in a carbon black reactor and is in operation, the combustion chamber surrounding the burner is supplied with the balance of the combustion air and is in communication with the reaction zone of the carbon black reactor. Feedstock oil is injected into the reaction chamber through a tubular subassembly inserted through a central opening in the assembly. plurality Other features of the preferred embodiment include: overlapping turning vanes to impart the swirling motion; a pllurality (e.g., three) of tubes to supply fuel oil to the fuel oil injection holes; an inward peripheral step or groove at the ends of the fuel oil spray holes; means for providing cooling air for the fuel oil supply tubes and for the inner annular ring; and means for providing purge air.

BRIEF DESCRIPTION OF THE DRAWING

FIG. 1 is a longitudinal view, partly in section, of a portion of one form of a suitable carbon black reactor in combination with the burner, combustion chamber, and feedstock injection assembly.

FIG. 2 is an elevational view, partly in section, illustrating the preferred embodiments of the burner;

FIG. 3 is a view, taken along the line 3—3 of FIG. 2.

DESCRIPTION OF THE PREFERRED EMBODIMENTS

Referring to FIG. 1, all the air required for combustion of the fuel and for the carbon black formation is supplied through the annulus 43 to the plenum 44 surrounding the combustion chamber 49 and burner 1. A considerable portion of this air enters the burner through slots 3 and is used as the medium to atomize the fuel oil and initiate intensive combustion. Referring to FIG. 2, this atomizing air passes through the annulus 2, defined by concentric pipes 5 and 7, into contact with atomizing air turning vanes 9 which are pitched at an angle of about 45°–67½°, preferably 50°–60°, from the axis in order to impart a strong swirling motion to the atomizing air. Vanes 9 are preferably overlapping as shown in FIG. 2, in order to assure a stable rather than an oscillating flame. By "overlapping," I mean overlapping at both the outer and inner diameters of annulus 2 and preferably overlapping by an equal percentage (e.g., at least 10% and most preferably at least 20%) at both such diameters. The overlap could be almost 100% as by the use of helices. Preferably, the edges of vanes 9 are bevelled to promote smoother flow. Alternately, a swirling motion could be provided by tangential entry of atomizing air through pipe 7 into such annulus. The swirling motion provides a high velocity in the tangential direction without incurring high axial or radial velocity.

The velocity of the atomizing air is then further increased by passage through the generally converging annulus in atomizing tip 11 defined by inner annular ring 11a and outer annular ring 11b. The atomizing air is thus passed in swirling motion and high velocity in a generally hollow, conical, divergent pattern. Ring 11a can be machined from carbon steel. Ring 11b should preferably be machined from a heat-resistant alloy metal.

The converging annulus can be of a venturi configuration or any other form of convergence that will accelerate the flow without excessive breakdown of the swirling flow pattern. A suitable convergent angle leading to the throat of tip 11 is about 10°–30°, preferably about 15°–20°.

The two surfaces of tips 11a and 11b downstream of the throat of tip 11 can be essentially parallel or diverging with an angle preferably not larger than about 7½°.

As indicated above, an important feature of this invention is the high swirl intensity of the air used to atomize the feedstock and initiate the combustion. Above a critical swirl intensity, recirculating flows are set up by the vortex region in the center of the flame near the burner mouth, providing additional residence time and intensive backmixing with heat and mass transfer from hot combustion products to the flow of fresh combustible mixture. At swirl numbers "S" larger than 0.6, this effect results in flames of remarkable stability and combustion intensity. The swirl number can be defined as the ratio between axial flux of angular momentum and axial flux of linear momentum. For the type of annular swirl as described in this invention, the swirl number can be approximated by:

$$s = 2/3 \; \frac{1 - (Rh/R)^3}{1 - (Rh/R)^2} \; \tan \alpha$$

$R = $ ½ outer diameter of annulus
$Rh = $ ½ inner diameter of annulus
$\alpha = $ angle of vane with axis of annulus
(Reference: *Combustion Aerodynamics*, Beer and Chigier, Chapter V)

The annulus referred to in the above equation is annulus 2 of this invention.

A swirl number of at least 0.6 and preferably at least 1.0 to 1.6 is required, depending on the axial flow velocities in the combustion chamber and reaction chamber, as well as the burning characteristics of the fuel. For the set of typical operating conditions quoted in the description below, a swirl number of $S = 1.2$ is used, resulting in a stable, transparent flame that is essentially burned out within the confines of the combustion chamber.

The atomizing tip 11 is designed to provide a narrow-angle, hollow conical pattern of about 15°–35°, preferably about 20°–25° diverging from the axis of the assembly.

A heat shield 12, of heat resistant alloy, is preferably affixed to tip 11a.

The liquid fuel oil is introduced through pipe 13 into annulus 14 from which it flows through a plurality (e.g., three) of fuel oil supply tubes 15 and connecting holes or oil passageways 15a. The fuel oil then enters a plurality (e.g., three) of separate groove sections 21 and finally enters the stream of atomizing air through a plurality (e.g., 12) of holes or oil passageways 23 disposed throughout the cross-sectional circumference of inner ring 11a. Oil passageways 23 are preferably aligned at an angle with respect to the radius; for example, tangential to the circumference of groove sections 21. This is done to provide a longer passage and thereby increase pressure drop, which can be deficient for perfect distribution of the liquid in case of very low liquid flow rates. For operation at high flow rates, a generally radial alignment of oil passageways 23 is preferred.

The inner ring 11a preferably includes an inward peripheral step or groove 25 at the ends of the fuel oil spray passageways 23. This step or groove shields the oil (emerging from the passageways) from the air to facilitate spread of oil around the tip between the holes, thus providing better distribution of the oil and more efficient atomization. The air actually strips oil from groove 25.

Although other means for supplying fuel oil to ring 11a may be used, the use of a plurality of separate tubes 15 rather than one large tube or annulus, to supply fuel oil to oil passageways 23, is advantageous for several reasons: (1) the increased velocity allows less time for heat transfer, thus preventing undesirable coking of oil in the tubes; (2) the individual tubes can be cooled by surrounding them with cooling air (described below); (3) more uniform distribution of oil to the holes 23.

In the manufacture of carbon black, it is usually considered preferable to preheat the combustion air to enhance the rate of fuel oil combustion as well as to improve the carbon black formation process itself. In such cases cooling air, introduced through pipe 17, is preferably used to cool the tubes 15 and then passes through air passageways 18 and 18a in tip 11a to cool tip 11a. This air then preferably passes through the small annular space between pipe 67 and pipe 19 as a purge to prevent oil from being deposited on pipe 67. Air passageways 18a are plugged, at 18b, by welding, so that air does not pass from air passageways 18 into the annulus between tips 11a and 11b. This cooling of tubes 15 and tip 11a permits the preheating of combustion air (entering slots 3) to temperatures as high as 750° F. or even higher without overheating and possible coking of the fuel oil.

It will be apparent to those skilled in the art that alternate means of providing cooling air could be used. For example, air passageways 18a could be eliminated and air passageways 18 could be extended horizontally to the front end of tip 11a, so that the air would flow out the end of tip 11a against heat shield 12 and thereby being directed as a purge against the feedstock injection subassembly 67.

It will also be apparent that purge air could be separately introduced through means (not shown) such as a separate air supply at the upstream end of the burner directly into the annulus between the inner surface of pipe 19 and the outer surface of pipe 67. It is also possible that the purge air could be passed around tubes 15 then directly into such annulus immediately upstream of inner ring 11a through holes (not shown) in pipe 19, without passing through ring 11a.

It should be noted that although the purge is highly desirable, it is not absolutely essential to the operability of the apparatus. For example, if the swirl number is such that an optimum flame pattern is developed, the impingement of oil droplets upon the relatively cool feedstock oil pipe 67 will be minor and might be tolerated. On the other hand, as the swirl number is increased to very high levels, a number of disadvantages occur including an unduly short, bushy flame (resulting from very great recirculation of hot combustion products) which can cause a substantial amount of fuel oil droplets to impinge upon the feedstock oil pipe 67. In the latter situation, use of purge air becomes of great importance. Other disadvantages of a very high swirl number include: (1) the recirculation of hot combustion products and the rate of combustion at the burner face will become so great that the burner will burn up; (2) the outer boundary of the hollow cone becomes more divergent, creating problems of flame impingement upon the upstream part of the combustion chamber; (3) higher swirl ratios result in a higher pressure drop resulting in greater power requirements for the combustion air blowers; (4) more fuel oil droplets will impinge upon the feedstock oil pipe, requiring the use of greater amounts of purge air. Even when the optimum pattern was obtained, it was observed that a small part consisting of oil droplets formed by recombination at the leading edge of the atomizer tip were drawn into the core and caused a minor impingement on the cool feedstock pipe. Such minor impingement may be eliminated by the use of purge air.

The subassembly comprising inner ring 11a and concentric pipes 5 and 19 can be adjusted longitudinally with respect to the remainder of the burner assembly of FIG. 2, in order to adjust the annular opening of the atomizing tip 11. Such adjustment is possible because pipe 5 is slideably mounted within packing gland 39. Such adjustment can be used to vary the angle of the fuel oil spray pattern for the purpose of changing the flame pattern.

Referring to FIG. 1, the burner is shown in combination with a suitable feedstock injection subassembly, combustion chamber and a portion of a carbon black reactor. In the embodiment shown, air passes through an inlet (not shown) such as inlet 14 of U.S. Pat. No. 3,256,065. The incoming air passes through annulus 43 defined by housing or shell 45 and inner tube 47. A portion of this incoming air becomes atomizing air as described above, and a portion becomes combustion air passing into the combustion chamber 49 through openings such as louvers 50 located in section 49a or elsewhere in the combustion chamber. If the preheating of air within the reactor shell 45 is not desired, the air could be brought into the reactor by different means. For example, an air inlet (not shown) could be provided at the upstream end of the reactor nearer the burner itself.

The first section 49a of the combustion chamber adjacent to the burner exit is actually a closing member through which burner 1 extends into the combustion chamber with a sliding fit. Section 49a can be divergent (frusto-conical), as shown, in order to enhance the capability of intense initiation of the flame. Such closing member could, however, be of another configuration.

The next section 49b of the combustion chamber may be cylindrical, as shown, to provide a zone of 'plug' flow to promote the 'burnout' (completion of combustion) characteristics of the flame pattern. The third section 49c of the combustion chamber is tapered to conform to the narrowed reaction chamber 53.

In manufacturing certain grades of carbon black, using reaction chambers with the same or even larger diameters than combustion section 49b, it has been found that section 49c and 49b can be eliminated so that the 'burnout' phase of the combustion takes place in the reaction chamber itself.

As shown in the drawings, combustion chamber section 49b and 49c, and a portion of 49a, as well as the reaction chamber 53, are refractory lined.

The preferred design includes a combined combustion chamber and reaction chamber. In this embodiment, sections 49a, 49b and 49c are replaced by a single refractory-lined, tapered frusto-conical section (not shown) extending from reaction chamber 53 to a point just upstream of tip 11 and downstream of slots 3. The upstream end of such tapered section terminates in a closing member as described above for section 49a, providing a sliding fit around the burner. Openings are also provided for the passage of combustion air. The preferred embodiment for this closing member, however, is a flat plate (having holes or louvers for passage of air), but other configurations, for instance frusto-conical, can be successfully utilized. The taper of the tapered section would thus be convergent in the upstream-to-downstream direction. The advantage of this embodiment over the embodiment of FIG. 1 is in simplicity of construction and operation. It also significantly reduces pressure drop over the combustion chamber.

In either of the two embodiments of the combustion chamber described above, the flow of air passing directly into the combustion chamber can be achieved through an annular passage between the closing member 49a and burner 1. Such an annular passage would be provided by including, in the closing member, a central orifice which is greater in diameter than the outside diameter of the burner, thus eliminating the close fit between the closing member and the burner. In this case all or a portion of the holes or louvers 50 may be eliminated.

The carbon black feedstock is introduced into the reaction chamber 53 through a tubular feedstock injection subassembly which will now be described. The carbon black feedstock oil is introduced through pipe 57 which is slideably mounted within axial pipe 59 and sealed therefrom by means of suitable packing glands included within closure member 61. The downstream end of feedstock pipe 57 is equipped with a suitable spray nozzle (not shown), which can be any conventional commercially available nozzle. The feedstock spray is shown by lines 58.

The upstream end of axial pipe 59 may be provided with a pipe 65 for introduction of axial air into the annulus between the feedstock pipe 57 and axial pipe 59, for the purpose of assuring that feedstock does not pass into the annulus.

A suitable feedstock injection assembly is disclosed in more detail in U.S. Pat. No. 3,741,165, which assembly is preferably water-cooled.

Cooling water enters through pipe 73 and exits through pipe 75.

Pipe 57 is slideably mounted within pipe 19 by means of closure member 79 so that the entire subassembly comprising the feedstock injection assembly may be positioned within the reactor at varying predetermined points in order to adjust the properties of the carbon black.

Although the reaction chamber 53 in FIG. 1 is shown as cylindrical, other reaction chamber configurations can be used to advantage. For example, reaction chamber 53 could be a converging frusto-conical configuration such as that described in U.S. Pat. No. 3,256,065.

To summarize, the principles used in this burner are:

1. Low pressure atomizing using a considerable part of the combustion air, accelerated in the zone where it contacts the fuel oil, to atomize the oil.

2. Imparting a swirling motion, with a high swirl ratio, to the atomizing air so as to obtain a high velocity in the tangential direction without incurring high axial or radial velocity; and using the effects of recirculation of hot combustion products within the vortex of a swirling flame to increase the combustion rate as has been demonstrated and described in previous research on combustion. This recirculation also involves flow reversal zones and backmixing, as mentioned above.

3. Providing the capability of inserting a tube with a cooled surface through the center of the burner assembly and extending beyond the face of the burner without aggregating coke and tarry deposits from the initial zone of flame and fuel injection on the cool surface of the pipe. This pipe is installed to provide a conduit through which the carbon black feedstock can be introduced into the carbon black reaction zone.

In utilizing the present invention, fuel oil discharge pressures are preferably 3.5–5 p.s.i.

A convenient and economical operation involves the use of the same oil for both the fuel oil and the feedstock. For example, a highly aromatic thermal tar having the following properties can be used both as the feedstock oil and the heavy fuel oil in the present invention:

| | |
|---|---|
| API Gravity | +0.5° |
| Viscosity | 100° F. - 27.9 c.s. |
| | 200° F. - 3.45 c.s. |
| Carbon content | 90.21% |
| Hydrogen content | 8.59% |
| Sulfur content | 1.20% |

Such oils are well known carbon black feedstocks.

Although carbon black feedstock oils are desirable fuel oils for the burner, other fuel oils can be used, for example: No. 6 and No. 5 heavy fuel oils; No. 4 heavy fuel oil; or any lighter fuel oils and petroleum refinery products such as naphtha, kerosene, diesel oil, gas oils, etc.

The oil feedstock rate will depend upon the particular grade of carbon black to be produced, the specific design and dimensions of the reactor, and the operating conditions used. Determination of the specific rate is within the ability of a person skilled in the art of carbon black manufacture.

The following is a set of conditions for a typical operation using the burner of this invention:

| | |
|---|---|
| Total combustion air* | 160,000 SCFH |
| Atomizing air (through tip 11) | 60,000 SCFH |
| Swirl number | 1.2 |
| Velocity exiting atomizing tip 11 | 585 ft/sec |
| Fuel oil rate | 65 GPH |

*(Note: This includes total air through annulus 43)

For the above-mentioned air loads, successful combustion could be obtained with fuel oil rates from 40 to 100 GPH, showing a turndown ratio for the burner of 2.5 to 1.

In the initial phase of burning, the fuel-air ratio is considerably in excess of stoichiometric. Due to the advantage of the reverse flow zone in the vortex caused by the swirling air, the combustion, even of this over-rich mixture, is intense. Temperatures of 3000° F. have been measured 1 inch from the burner mouth. It is known that such over-rich combustion, even at high temperature, inhibits the formation of nitrogen oxides. During subsequent burning and gradual mixing with cooler air entering through openings 50, the flame temperature is sufficiently reduced to prevent nitrogen oxide formation in the leaner combustion mixture. The generation of air polluting nitrogen oxides is therefore significantly reduced by this combustion method.

To start up the burner, it is lit using gas or lighter fluid and then brought up to full load with fuel oil quickly replacing the gas or lighter fluid.

It has been unexpectedly found that the use of this oil burner has permitted substantially higher feedstock oil rates than is possible with the use of a gas burner under otherwise equal operating conditions and heat input. For example, a number of pilot plant runs were made to determine, among other things, the feedstock oil rate and yield obtainable using my invention (constructed per FIGS. 1–3 with the preferred design of the combustion chamber-reactor described above) as compared with a prior art natural gas burner (constructed per FIG. 1 of U.S. Pat. No. 3,741,165).

From the data obtained, the following two runs were subsequently selected to show obtainable feedstock oil rate and yield when making HAF-HS grade carbon black under the same conditions[1], in the same equipment (except, of course, the burners):

| Run No. | 1340A | 1340F |
|---|---|---|
| Fuel | Feedstock Oil[2] | Natural gas |
| Burner | Present Invention | 3,741,165-FIG. 1 |
| Combustion air, SCFH | 150,000 | 150,000 |
| Air Preheat | 610° F. | 610° F. |
| Fuel Oil Preheat | 240° F. | — |
| Fuel rate | 60.5 GPH | 10,000 SCFH[3] |
| Feedstock Oil Rate, GPH | 245 | 198.4 |
| Yield, lbs. black/gal. feed | 4.94 | 4.37 |
| Properties of Carbon Black | | |
| Iodine number | 93.8 | 85 |
| DBP of pelletized black | 120.3 | 119.4 |
| Tint | 108 | 112 |

Notes:
[1]In both runs, the quench distance was the same, in order to produce an HAF-HS black of satisfactory Iodine No. (85–95) and other specifications.
[2]The feedstock oil (used as feedstock oil and as fuel oil) was a carbon black feedstock oil as described above.
[3]The 10,000 SCFH natural gas fuel rate is equivalent, on a BTU basis, to the 60.5 GPH fuel oil rate of Run 1340A.

To anyone skilled in the art, the above results show that the 198.4 GPH feedstock oil rate for Run No. 1340F is the upper limit for this grade of black under these conditions, because if that rate had been exceeded, the iodine number lower limit of 85 would not have been met. In other words, to increase the feedstock oil rate above 198.4 and still obtain an iodine number of at least 85 would have required a greater quench length (which, as is well known in the art, would have produced a black having other undesirable properties, e.g., poor rubber reinforcing properties).

The above data establishes that substantially higher feedstock oil rates and yields are obtainable using my invention as compared with the use of natural gas as fuel, under the same conditions while making carbon black of comparable quality. Such improved feedstock oil rates and yields were not expected.

While I have thus described the preferred embodiments of the present invention, many variations will be suggested to those skilled in the art. The foregoing description and examples should therefore not be considered limitative; and all such variations and modifications as are in accord with the principles described are meant to fall within the scope of the appended claims.

Having thus described my invention, I claim:

1. In combination with a carbon black reactor, a burner and feedstock injection assembly comprising:
   first (inner) and second (outer) concentric pipes defining a first annulus for passage of atomizing air:
   means for introducing air into said first annulus;
   means within said first annulus for imparting a strong swirling motion to said atomizing air such that a swirl number of at least about 0.6 may be created, said means comprising a plurality of turning vanes pitched at an angle of about 45°–67½° from the axis of the assembly;
   first (inner) and second (outer) annular concentric rings affixed to the downstream ends of said first and second concentric pipes, respectively, said rings defining two annular surfaces which initially converge to a throat and are thereafter essentially parallel or slightly divergent, said annular surfaces downstream of said throat defining a discharge annulus directed in a generally hollow, frusto-conical, divergent pattern directed at an angle of about 15°–35° with respect to the centerline of said third pipe;
   a third pipe, concentrically disposed within said first pipe, defining a second annulus, the downstream end of said third pipe being affixed to said inner ring;
   a plurality of oil passageways, in said inner ring, leading from said second annulus into said discharge annulus at points downstream of said throat;
   means for introducing fuel oil to said oil passageways;
   a tubular carbon black feedstock injection subassembly inserted through the center of said third pipe; and
   a combustion chamber which surrounds the assembly and which is in open communication with the reaction zone of said reactor.

2. The combination of claim 1 in which said oil passageways are connected to a plurality of fuel oil supply tubes disposed in said second annulus.

3. The combination of claim 2 in which there are at least three of said fuel oil supply tubes.

4. The combination of claim 3 in which there are a plurality of said oil passageways connected to each of said fuel oil supply tubes by means of grooved sections in said inner annular ring.

5. The combination of claim 4 in which said inner annular ring contains an annular inward peripheral step at the outlet end of each of said oil passageways.

6. The combination of claim 4 in which said oil passageways are aligned at an angle with respect to the radius of the cross section of said assembly.

7. The combination of claim 5 in which said oil passageways are aligned at an angle with respect to the radius of the cross section of said assembly.

8. The combination of claim 1 in which said turning vanes are pitched at an angle of about 50°–60° from the axis of the assembly.

9. The combination of claim 8 in which said vanes are overlapping.

10. The combination of claim 1 in which said two annular surfaces converge at an angle of about 10°–30°.

11. The combination of claim 8 in which said two annular surfaces converge at an angle of about 10°–30°.

12. The combination of claim 9 in which said two annular surfaces converge at an angle of about 10°–30°.

13. The combination of claim 1 including a plurality of cooling air passageways in said inner annular ring, said passageways being connected to a source of air.

14. The combination of claim 2 in which said second annulus is connected to a supply of cooling air for said fuel oil supply tubes.

15. The combination of claim 2 in which said second annulus is connected to a supply of cooling air for said fuel oil supply tubes, and including a plurality of cooling air passageways in said inner annular ring, said annulus being connected to said cooling air passageways.

16. The combination of claim 1 including means for passing purge air through the annulus between the inner surface of said third pipe and outer surface of said tubular carbon black feedstock injection subassembly.

17. The combination of claim 13 in which said cooling air passageways are directed into the annulus between the inner surface of said third pipe and the outer surface of said tubular carbon black feedstock injection subassembly.

18. The combination of claim 14 in which said second annulus is connected to the annulus between the inner surface of said third pipe and the outer surface of said tubular carbon black feedstock injection subassembly.

19. The combination of claim 15 in which said cooling air passageways lead to a plurality of holes through the wall of said third pipe, said holes leading to the annulus between the inner surface of said third pipe and the outer surface of said tubular carbon black feedstock subassembly.

* * * * *

UNITED STATES PATENT OFFICE
CERTIFICATE OF CORRECTION

Patent No. 3,990,854            Dated November 9, 1976

Inventor(s) Karel R. Dahmen

It is certified that error appears in the above-identified patent and that said Letters Patent are hereby corrected as shown below:

Column 7, line 37, after "Pipe" delete "57" and insert --67-- therefor.

Signed and Sealed this

Twenty-fourth Day of May 1977

[SEAL]

Attest:

RUTH C. MASON  
*Attesting Officer*

C. MARSHALL DANN  
*Commissioner of Patents and Trademarks*